United States Patent [19]

Labonville

[11] Patent Number: 4,515,198
[45] Date of Patent: May 7, 1985

[54] MEANS FOR DETACHABLY CONNECTING A CHAIN LINK TO A SKIDDER RING

[76] Inventor: Emilien Labonville, R.F.D. #1, Berlin, N.H. 03570

[21] Appl. No.: 605,148

[22] Filed: Apr. 30, 1984

[51] Int. Cl.³ .................. B60C 27/20; B60C 27/06
[52] U.S. Cl. .................. 152/223; 24/230.5 AD;
    24/230.5 W; 59/93; 152/225 R; 152/228;
    152/242; 152/243; 294/82.11; 301/42; 301/44
    R; 403/209; 403/353
[58] Field of Search ............... 152/243, 232, 239, 240,
    152/213 A, 220, 223, 244, 231, 242, 171, 172,
    189, 228; 59/78, 86, 93; 24/116 R, 230.5 AD,
    230.5 W; 301/42, 44 R; 278/52, 65, 96; 294/78
    R, 78 A, 82 R; 403/209, 353

[56] References Cited
U.S. PATENT DOCUMENTS
1,635,017 7/1927 Sunde ................. 152/239 X
1,981,394 11/1934 Smith ................. 152/243
4,243,088 1/1981 Labonville ............ 152/223

Primary Examiner—Edward Kimlin
Assistant Examiner—Thomas Bokan
Attorney, Agent, or Firm—C. Yardley Chittick

[57] ABSTRACT

Simplified means for connecting skidder rings to the tag chains that hold the skidder rings in spaced positions around a tractor wheel. Each skidder ring has four hooks spaced approximately 90° apart, two at each side, of novel construction. Each hook is so shaped as to permit easy attachment thereto of the end link of a tag chain but which will positively preclude disconnection of the link from the hook when the parts are in operating position on the wheel.

6 Claims, 10 Drawing Figures

MEANS FOR DETACHABLY CONNECTING A CHAIN LINK TO A SKIDDER RING

BACKGROUND OF THE INVENTION

Reference is made to the present inventor's earlier issued U.S. Pat. No. 4,243,088 for Skidder Ring and Chain Connecting Means. Therein is shown the basic construction of one form of skidder ring and its connecting chains as currently in use in the logging industry. While the means disclosed in this patent for connecting the tag chains to the skidder rings was a substantial improvement over the prior art, still there was the requirement of the use of welding equipment which on occasion might not be available at the time of the breakage of a tag chain.

An examination of all other prior art anti skid devices used in the logging industry shows that the connection of the skidder rings to the tag chains is intended to be permanent and not subject to simple manual attachment or detachment.

SUMMARY OF THE PRESENT INVENTION

The present invention comprises a skidder ring having at its four corners integral outwardly extending hooks of novel construction whereby the end links of the tag chains may be manually connected thereto and disconnected therefrom. The hooks however are of such configuration that when the connected links are in operative position, the links cannot become disconnected from the skidder ring during operation of the tractor. Upon the breaking of a link of the tag chain such that the repair thereof requires disconnection of the end link from its hook, such removal may be readily accomplished by manual manipulation of the link. The replacement end link of the tag chain may then be manually placed on the hook to put the skidder ring back in operative condition.

The foregoing results are achieved by shaping the end of the hook in such manner that the end link can be mounted on the hook only when initially held in vertical position but thereafter when the link is rotated to normal operating position, it cannot be disengaged from the hook while the tractor is in operation.

The invention will be better understood as the description proceeds with the aid of the accompanying drawings in which FIG. 1 is a perspective view of a skidder ring having the novel hooks at the four corners thereof.

FIG. 2 shows a skidder ring, drawn to reduced scale, in position on a tractor tire with tag chains connected to two of the hooks.

FIG. 3 drawn to enlarged scale is a plan view of a corner of a skidder ring with a hook extending therefrom and showing a broken away link in initial vertical position at the hook end.

DESCRIPTION OF A PREFERRED EMBODIMENT OF THE INVENTION

Figure 1:
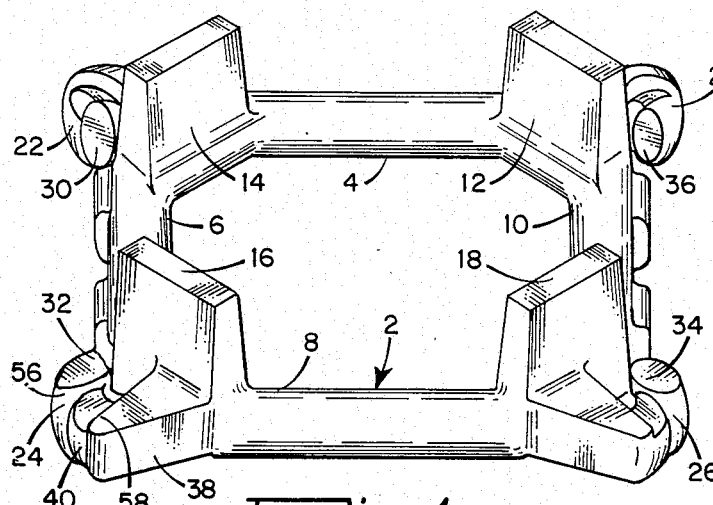

Referring first to FIG. 1, there is shown a skidder ring 2, the same as the skidder ring shown in my patent 4,243,088 above referred to. The four sides 4, 6, 8 and 10 support at the corners lugs 12, 14, 16 and 18. Adjacent the lugs are the novel hooks 20, 22, 24 and 26.

The skidder ring when in position on the tractor tire 28 (see FIG. 2) has the sides 4 and 8 paralleling the tire circumference so that the hook ends 30, 32 and 34, 36 on adjacent hooks face each other. In this preferred arrangement, there is less likelihood of the hooks catching on passing material and the strength of the hooks may possibly be greater in this attitude. However, no limitation is being placed on the arrangement of the ends of the four hooks. The ends may face in either direction.

Figure 3:
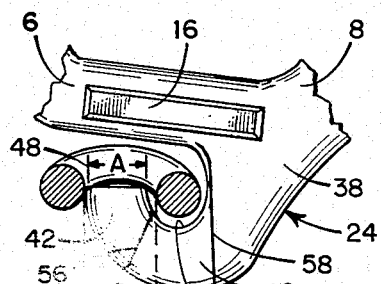
Figure 4:
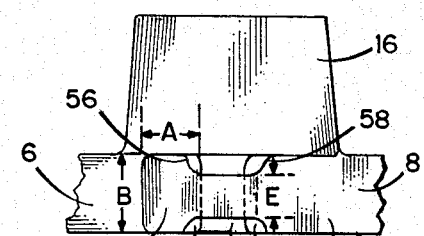
FIG. 4 is a front elevation of FIG. 3 with the link omitted.
Figure 5:
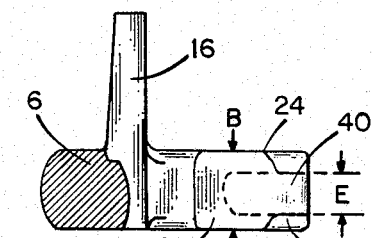
FIG. 5 is a side elevation of FIG. 4.

Enlarged detailed views of hook 24 are shown in FIGS. 3, 4 and 5. The base 38 of hook 24 extends from side 8. The hook curves around at 40 to terminate in end 42. As can be seen in FIGS. 4 and 5, the curved midsection 40 is of reduced vertical dimension.

In the following description, the skidder ring will be considered as in horizontal position with the hooks extending horizontally from the corners.

Figure 2:
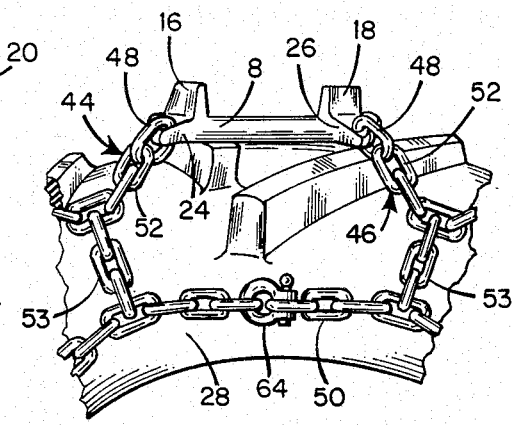

Referring to FIG. 2, the conventional means for mounting skidder rings on a tractor tire is shown. Each skidder ring is held in position by four tag chains of which two are shown at 44 and 46. The end links 48 are attached to hooks 24 and 26. Similar chains not shown in FIG. 2 are connected to hooks 22 and 20 on the opposite side of the tire. The tag chains 44 and 46 are connected to conventional side chains 50 by intermediate radial connecting chains 53. See U.S. Pat. No. 4,243,088 for details of chain arrangements.

Assume now that end link 48 of tag chain 44 is to be connected to hook 24. The next link connected to link 48 is link 52. The tag chain must be slack so that links 48 and 52 and the other links connected thereto may be moved freely by hand. The horizontal dimension A of the hook end 42 (see FIGS. 3, 4 and 10) is slightly less than the internal width D of link 48. The vertical dimension B of the end 42 of the hook (see FIGS. 4, 5, 6, 8 and 9) is slightly less than the interior longitudinal space C between the lower interior end of link 48 and the exterior lower end of link 52. Conversely, B is greater than D and E, the vertical dimension of midsection 40 of the hook is less than D (see FIGS. 4, 5, 6, 8 and 9).

Figure 6:
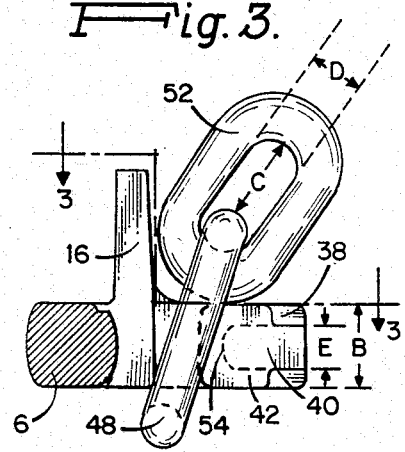
FIG. 6 is the same as FIG. 5 as to the hook, but showing the initial position of the end link of the tag chain as connection of the parts commences.
Figure 7:
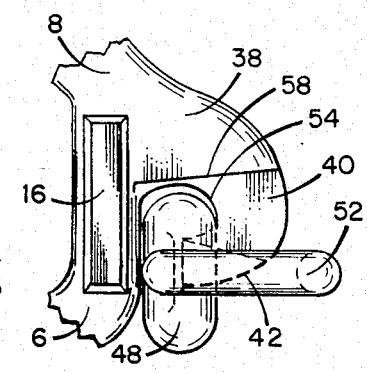
FIG. 7 is a plan view of FIG. 6.
Figure 8:
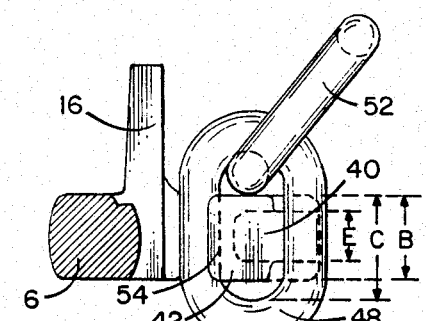
FIG. 8 is the same as FIG. 5 as to the hook, but the end link while still in vertical position has been rotated counter clockwise about its long axis from the position in FIG. 6 to pass over the end of the hook.

With the foregoing relative dimensions in mind, it will be apparent that link 48 can only be placed on the hook by holding it vertically as shown in FIGS. 3, 6 and 7 so that the interior space in link 48 will accept the end 42 of hook 24. As soon as end 42 has passed through link 48 and with link 48 hanging vertically from link 52, links 48 and 52 are rotated counter clockwise about their long axes to assume the position shown in FIG. 8. In this view, the long vertical sides of link 48 will straddle intermediate section 40 with the left side positioned in bight 54.

Figure 9:
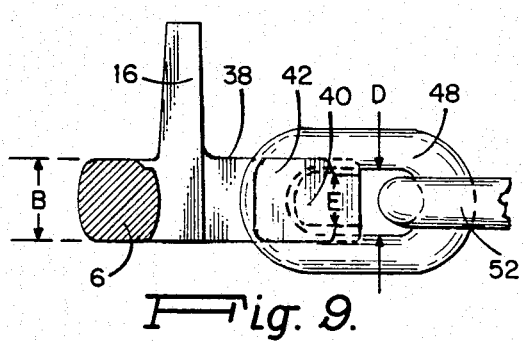
FIG. 9 is the same as FIG. 8 except that the end link has been rotated clockwise so that the left end of the link is in the bight of the hook.
Figure 10:
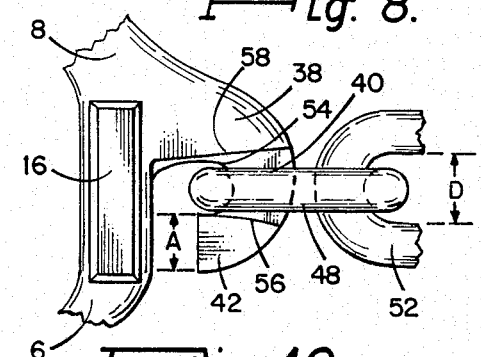
FIG. 10 is a plan view of FIG. 9.

The links 48 and 52 may then be rotated 90° clockwise to assume the final connected position illustrated in FIGS. 9 and 10. Since the vertical dimension B of the end of the hook is greater than the transverse interior dimension D of link 48, the link cannot be removed from the hook while it is in its operative position shown in FIGS. 9 and 10. Link 48 may move freely within tolerable limits with respect to the hook. That is, it may swing laterally within the side walls 56, 58 and 60, 62 that bound the top and bottom of intermediate section 40. Likewise since the vertical dimension E of the intermediate section 40 is appreciably less than the interior transverse dimension D of link 48, link 48 may rotate adequately in a vertical plane around section 40 to accommodate any direction of pull of tag chain 44.

It will be understood that the dimensions of the hook and the cooperating links will be made adequate to carry the operating loads. The exact curvature of the hook is not critical except that the hook end must be so shaped that the end link 48 of the tag chain can pass thereover only when the link is held vertically as in FIGS. 6 and 7. The hook must permit rotation of the link about its long axis to a position over the midsection 40 as in FIG. 8 and the midsection dimension must permit rotation about an axis normal to the plane of the link so that the link can be turned to operative position shown in FIGS. 9 and 10.

When it becomes necessary to remove link 48 from hook 24, the tag chain must be slacked sufficiently by disconnecting the shackle 64 in the side chain 50. Of course, if the tag chain has broken, slack will automatically result. Then the reverse procedure is followed. Link 48 is swung from its horizontal position in FIGS. 9 and 10 to vertical position as in FIG. 8. The link is then rotated about its long vertical axis clockwise to pass over the end 42 of the hook to reach the position shown in FIGS. 6 and 7 when it may be drawn laterally out through the space between the hook end 42 and the skidder ring body.

While the foregoing description has been directed specifically to the construction of hook 24, it will be understood that it is equally applicable to hook 20. It applies also to the hooks 22 and 26, except that in the initial application of the link to these hooks, the vertical link is rotated clockwise to move it to position over the intermediate section.

The preferred location of the hooks on the skidder ring is adjacent the lugs so that the lugs will assume the most effective position on the tire. However, the hooks could be placed elsewhere without departing from the invention. In the claims the term "thickness of the said link to be connected thereto" means the diameter of the cylindrical metallic stock used in making the links of the drain that are to be attached to the skidder ring.

It is intended to cover all changes and modifications of the example of the invention herein chosen for purposes of the disclosure which do not constitute departures from the spirit and the scope of the invention.

I claim:

1. A skidder ring having means at four spaced locations for connection with the end links of tag chains, each said means comprising a hook integral with said ring and extending away from said ring generally in the plane of said ring, each said hook having a base portion attached to the ring, an intermediate section and an end portion, said end portion being spaced from said ring a distance greater than the thickness of the link to be connected thereto, the vertical cross sectional shape of said end portion being such as to permit the passage of said link thereover only when said link is held in substantially vertical position, the transverse horizontal and vertical dimensions of said intermediate section being less than the transverse interior dimension of said link, and the vertical dimension of said end portion being greater than the transverse interior dimension of said link.

2. The construction set forth in claim 1, the vertical dimension of said end portion being less than the long interior dimension of said link diminished by the thickness of the material of the adjacent link.

3. The construction set forth in claim 2, the transverse horizontal dimension of said end portion being less than the transverse interior dimension of said link.

4. The construction set forth in claim 1, in which the ends of adjacent hooks extend in opposite directions.

5. The construction set forth in claim 1, the upper surface of the intermediate section being below the upper surface of said end portion and, the lower surface of the intermediate section being above the lower surface of said end portion.

6. The construction set forth in claim 1, said skidder ring including four upstanding circumferentially spaced lugs, each said hook being located at the position of one of said lugs.

* * * * *